United States Patent
Nair et al.

(10) Patent No.: US 7,243,224 B2
(45) Date of Patent: Jul. 10, 2007

(54) PREBOOT EXECUTION BOOTLOADING

(75) Inventors: Remesh Seth Nair, Batu Feringgi (MY); Alan Previn Terres Alexis, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 10/749,999

(22) Filed: Dec. 31, 2003

(65) Prior Publication Data
US 2005/0149716 A1    Jul. 7, 2005

(51) Int. Cl.
*G06F 9/24* (2006.01)

(52) U.S. Cl. ......................................... 713/2; 709/219

(58) Field of Classification Search ................ None
See application file for complete search history.

(56) References Cited

U.S. PATENT DOCUMENTS

| | | | | |
|---|---|---|---|---|
| 5,974,547 | A  * | 10/1999 | Klimenko .................... 713/2 |
| 6,175,918 | B1 * | 1/2001  | Shimizu ..................... 713/1 |
| 6,240,169 | B1 * | 5/2001  | Haskins et al. ......... 379/114.02 |
| 6,317,826 | B1   | 11/2001 | McCall et al. |
| 6,473,857 | B1 * | 10/2002 | Panas et al. ................ 713/2 |
| 6,954,852 | B2 * | 10/2005 | Burokas et al. ............. 713/2 |

* cited by examiner

*Primary Examiner*—Thuan Du
(74) *Attorney, Agent, or Firm*—Blakely, Sokoloff, Taylor & Zafman LLP

(57) ABSTRACT

A method and apparatus are described for preboot execution bootloading. Under and embodiment of the invention, a method comprises requesting a memory address region and boot image data from a server; receiving the boot image data and a designated memory region from the server; and storing the boot image data at the designated memory region.

25 Claims, 5 Drawing Sheets

PREBOOT EXECUTION BOOTLOADING

FIELD

An embodiment of the invention relates to computer execution in general, and more specifically to preboot execution bootloading.

BACKGROUND

In computer processing, the actual speed of operation for users is based on numerous factors. One factor that may be of concern is the boot up speed. Boot up performance is a benchmark that is often used to compare operational speed of computer systems.

While much of boot up performance is a function of how fast the processor of in a system performs operations, an additional variable is the choice of boot up media and the efficiency of the boot up process. A network is one of the media types that may be utilized in booting up operating systems. A typical network boot may rely on the use of PXE (preboot execution environment) processes to enable a pre-boot environment. This is done to provide a network interface for downloading the OS (operating system) boot image.

However, conventional methods of network booting of an operating system may be inefficient. A conventional process generally may include setting up a ramdisk, downloading a network bootstrap program (NBP) to the ramdisk from a server, and running network bootstrap program to load the operating system. Thus, conventional remote bootloading may require that certain time-consuming operations be completed before the operating system can be initialized.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
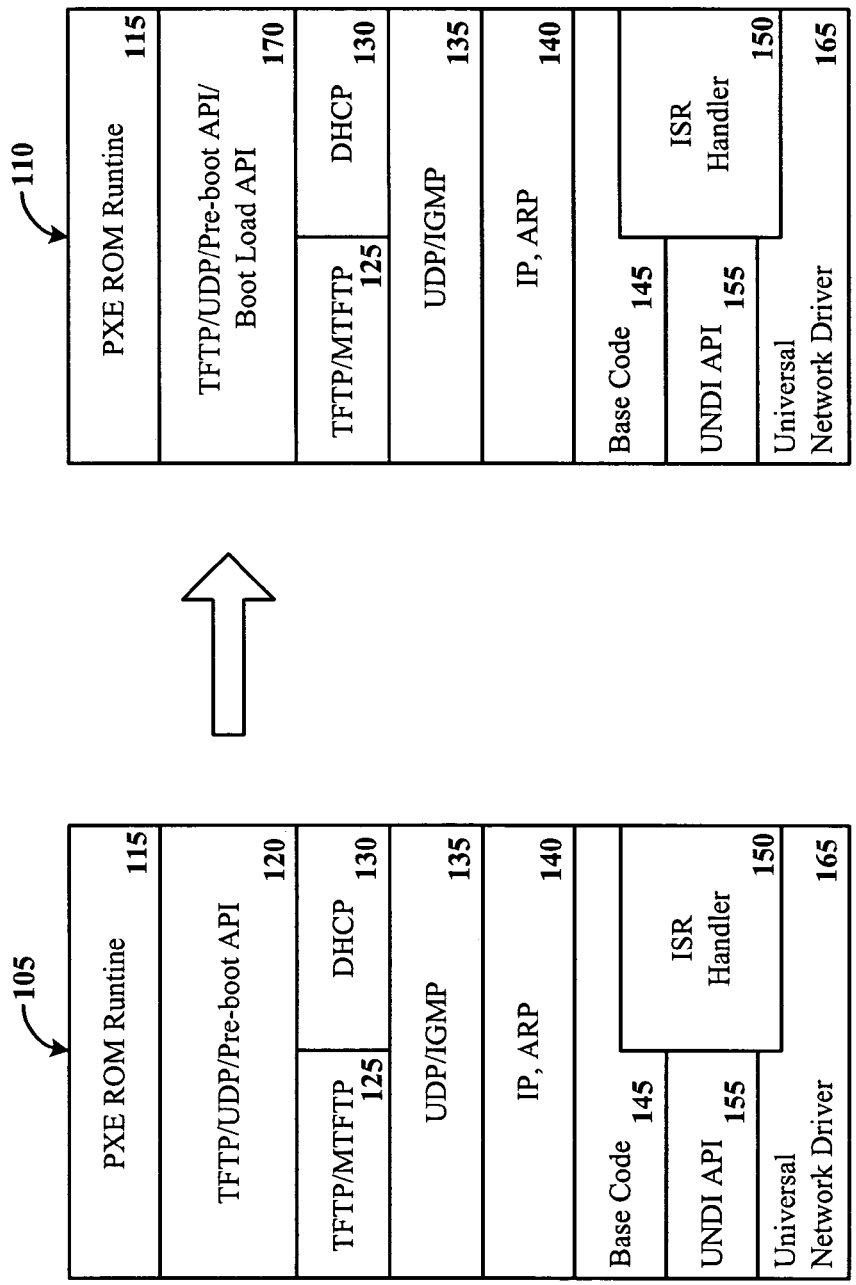
FIG. 1 illustrates an embodiment of a software stack for remote boot up.

A method and apparatus are described for preboot execution bootloading.

Before describing an exemplary environment in which various embodiments of the present invention may be implemented, certain terms that will be used in this application will be briefly defined:

As used herein, "boot" means to load software to start a computer. For example, because the operating system (OS) is used for running all other programs, the OS is loaded during the boot process.

As used herein, "ramdisk" or "RAM disk" means a virtual computer drive created by allocating or setting aside a portion of the random access memory (RAM) for use as if it were a hard drive or similar drive.

As used herein, "remote booting" or "network booting" describes a process of booting a computer via a network.

Under an embodiment of the invention, a computer is remotely booted up by using the preboot environment to load up the operating system. Under an embodiment of the invention, the PXE (preboot execution environment) is utilized to directly load network data into system memory. Under an embodiment of the invention, a PXE API (application programming interface) includes bootloading functionality.

PXE is a protocol established by Intel Corporation that enables computers to boot through a network. PXE processes may, for example, be stored in the ROM of network cards. When the computer boots up, the BIOS loads the PXE ROM in the memory and executes it. PXE processes are described in the Preboot Execution Environment Specification 2.1, Sep. 20, 1999, of Intel Corporation.

PXE allows a workstation to boot from a server on a network prior to booting the operating system on the local hard drive. PXE may be utilized to set up a common set of pre-boot protocol services within a client to ensure that network-based booting is accomplished through an industry standard protocol for communication with the server.

In a conventional system, a downloaded network bootstrap program (NBP) is required to be presented with a uniform and consistent pre-boot operating environment within the booting client. A conventional system may enable processes such as remote new system setup, remote emergency boot, and network boot processes. Such capabilities may use PXE to form a heterogeneous network, to acquire a network address from a DHCP (dynamic host configuration protocol) server, and to set up a ramdisk within system memory. The ramdisk may then be used to download the network bootstrap program. The network bootstrap program may download the operating system boot, which then may run the bootloading program to load the operating system.

Under an embodiment of the invention, bootloader functionality for a computer is incorporated into the computer's preboot environment, such as in PXE. Under an embodiment of the invention, PXE is used to load the operating system. The incorporation of such functionality into the environment may be utilized to increase the speed of network booting of an operating system.

Under an embodiment of the invention, a user may make use of the bootloader functionality of a preboot environment by providing a destination memory location where the network data may be copied. Under an embodiment of the invention, the PXE may be used to directly load network data into system memory through the use of the UNDI (universal network device interface) network interface.

Under an embodiment of the invention, a preboot environment is extended to include bootloading, which may allow for standardized implementation of network booting processes. In one embodiment, the PXE API (application programming interface) may be extended to include bootloading functionality. Under an embodiment of the invention, PXE bootloader functionality may allow for efficient remote booting by eliminating the need for a network bootstrapping program.

FIG. 1 illustrates an embodiment of a software stack for a remote boot up. A conventional software stack 105 provides for PXE ROM runtime 115. This is followed by the TFTP (trivial file transfer protocol), the UDP (user datagram protocol), and the pre-boot API 120. The software stack 105 then includes the TFTP/MTFTP (multicast trivial file transfer protocol) 125 for PXE and the DHCP 130 (dynamic host configuration protocol) for IP address allocation. The stack then provides the UDP/IGMP (user datagram protocol/Internet group management protocol) 135. The stack then includes the IP (Internet protocol) and ARP (address resolution protocol) 140. This is followed by the base code 145, the UNDI (universal network device interface) 155, and the universal network driver 165. Overlapping with the base code 145, UNDI 155, and network driver is the ISR (interrupt service routine) handler 150.

An embodiment of a software stack 110 is modified to include a boot load API 170. Under an embodiment of the invention, the inclusion of the boot load API enables the client to proceed with a network boot without requiring a network bootstrap program.

Figure 2:
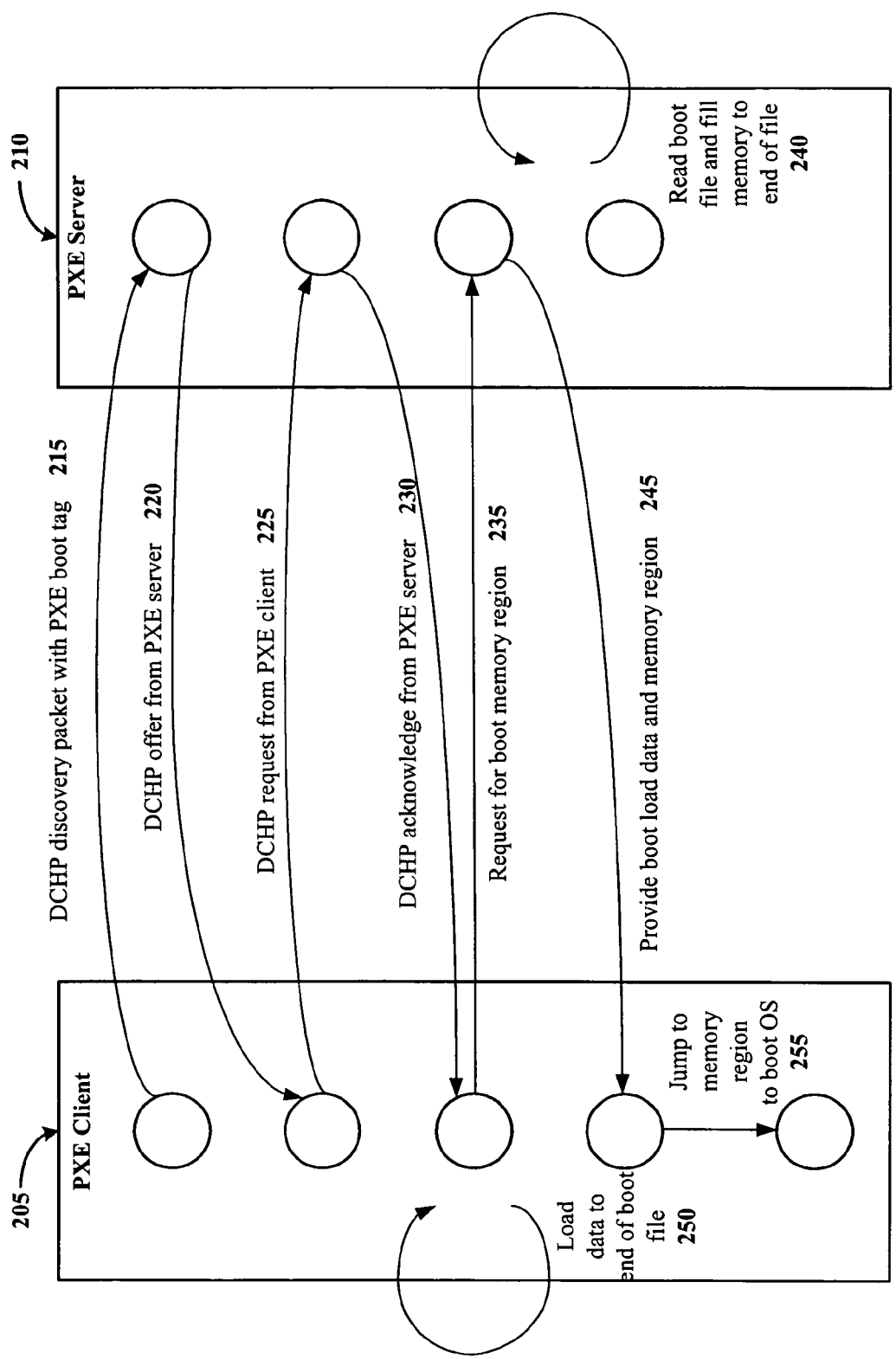
FIG. 2 illustrates an embodiment of operations of a client and server in a remote boot up process.

FIG. 2 illustrates an embodiment of operations of a client and server in a remote boot up process. In this illustration, the operations of a PXE client 205 and a PXE server 210 under an embodiment of the invention are shown. In this embodiment, the process includes the PXE client sending a DHCP discovery packet with a PXE boot tag (a network protocol identifier) 215 to the PXE server. The PXE server then sends a DCHP offer packet 220. After determining that the IP address is legitimate, the PXE client sends a DHCP request packet 225 to the PXE server. The PXE server returns a DCHP acknowledge packet 230. The PXE client makes a request for a boot memory region 235. The PXE server reads the boot file and fills memory to the end of the boot file 240. The PXE server then responds with the boot load data and the memory region 245. The PXE client than loads the boot load data to the end of the boot file 250. The client machine thus receives the information and loads the boot image directly into the specified memory region in system memory. This process continues until the end of the boot file. Upon detecting the end of the boot file, the client jumps to the allocated OS memory region to run the operating system 255.

Figure 3:
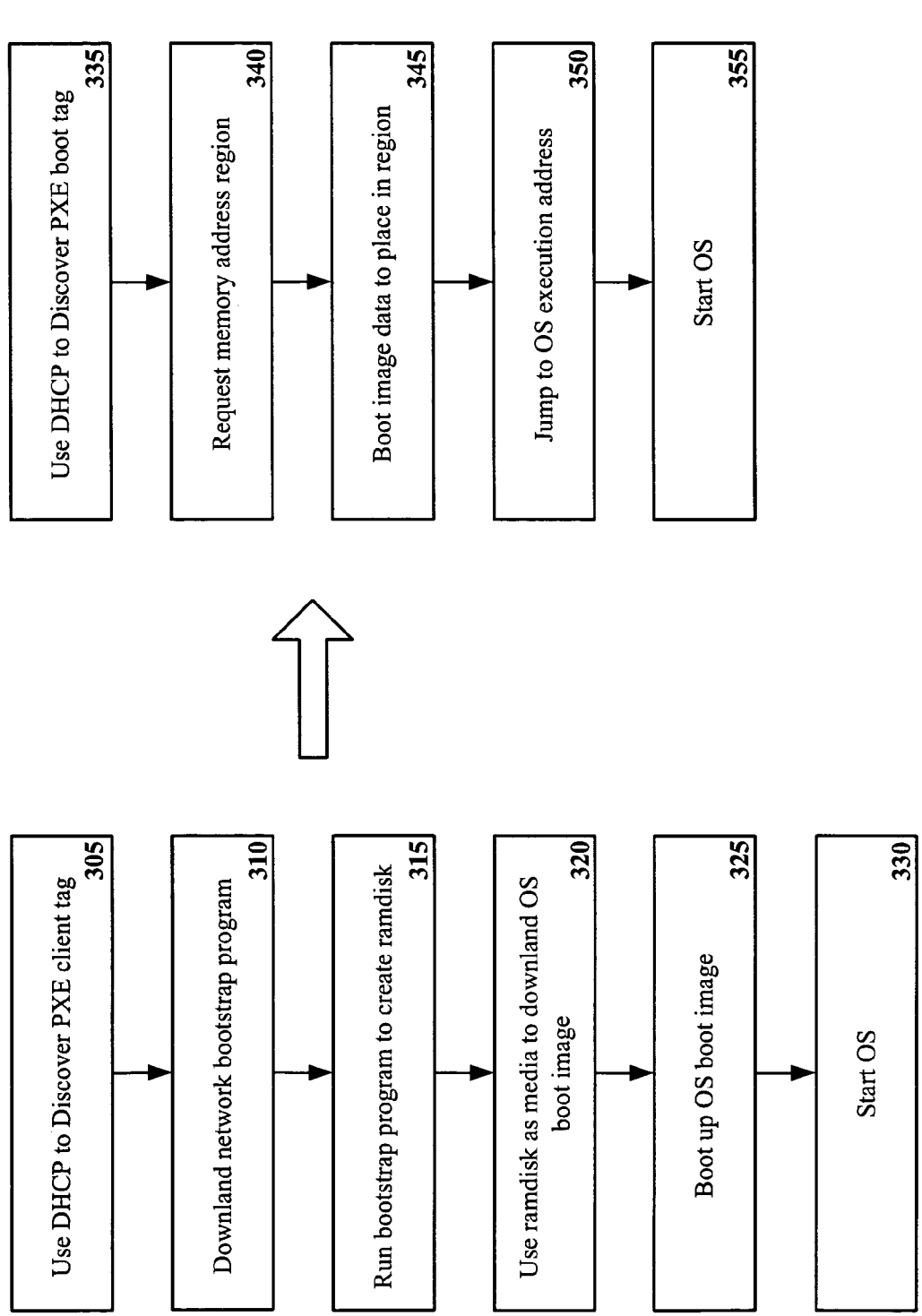
FIG. 3 contains flowcharts to illustrate an embodiment of a boot up process.

FIG. 3 contains flowcharts to illustrate an embodiment of a boot up process. In a conventional PXE remote boot up process, a PXE client uses the DHCP to discover a PXE client tag 305. After obtaining an IP address, the PXE client then downloads the network bootstrap program 310. After downloading, the client runs the network bootstrap program to create a ramdisk 315. The ramdisk is used as the media to download the OS boot image 320. The client then boots up the OS boot image 325 and starts the operating system 330.

In comparison, under an embodiment of the invention, a client may use the DHCP to discover a PXE boot tag (network protocol identifier) 335. In this embodiment, the client can then request the memory region address 340 and boot image data to place in the allocated memory region 345. The client then can jump to the OS execution address 350 and proceed to start the operating system 355. The operation thus may allow more efficient OS booting and system initialization without the use of a network bootstrap program.

Figure 4:
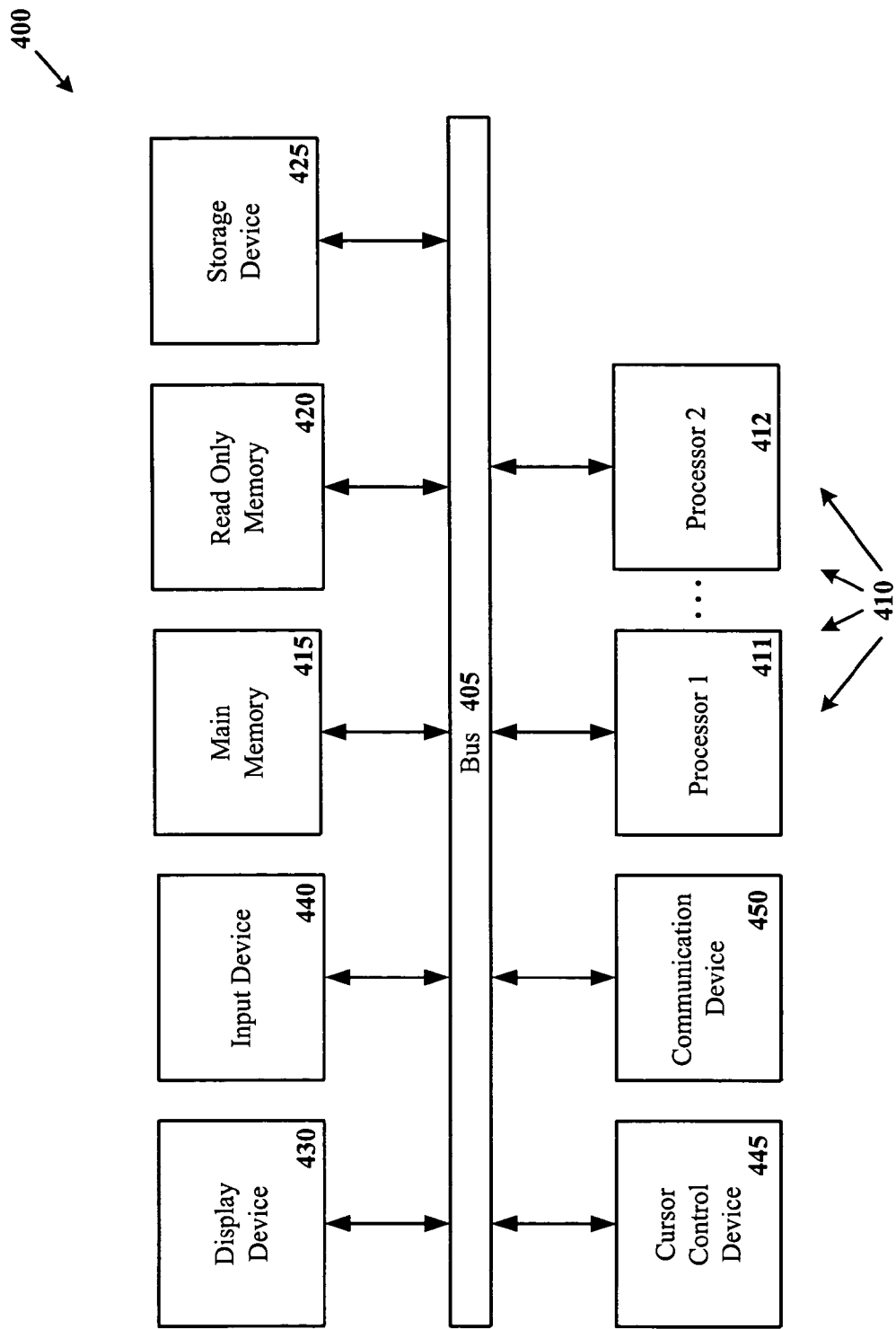
FIG. 4 illustrates an embodiment of a computer environment.

FIG. 4 illustrates an embodiment of an exemplary computer environment. Under an embodiment of the invention, a computer 400 comprises a bus 405 or other communication means for communicating information, and a processing means such as one or more physical processors 410 (shown as 411 through 412) coupled with the first bus 405 for processing information. Each of the physical processors may include multiple logical processors, and the logical processors may operate in parallel in the execution of drivers. Each processor may include an execution unit and logic for the operation of certain functions.

The computer 400 further comprises a random access memory (RAM) or other dynamic storage device as a main memory 415 for storing information and instructions to be executed by the processors 410. RAM memory may include dynamic random access memory (DRAM) and static dynamic random access memory (SRAM). Main memory 415 also may be used for storing temporary variables or other intermediate information during execution of instructions by the processors 410. The computer 400 also may comprise a read only memory (ROM) 420 and/or other static storage device for storing static information and instructions for the processor 410.

A data storage device 425 may also be coupled to the bus 405 of the computer 400 for storing information and instructions. The data storage device 425 may include a magnetic disk or optical disc and its corresponding drive, flash memory or other nonvolatile memory, or other memory device. Such elements may be combined together or may be separate components, and utilize parts of other elements of the computer 400.

The computer 400 may also be coupled via the bus 405 to a display device 430, such as a liquid crystal display (LCD) or other display technology, for displaying information to an end user. In some environments, the display device may be a touch-screen that is also utilized as at least a part of an input device. In some environments, display device 430 may be or may include an auditory device, such as a speaker to produce voice or other auditory information. An input device 440 may be coupled to the bus 405 for communicating information and/or command selections to the processor 410. In various implementations, input device 440 may be a keyboard, a keypad, a touch-screen and stylus, a voice-activated system, or other input device, or combinations of such devices. Another type of user input device that may be included is a cursor control device 445, such as a mouse, a trackball, or cursor direction keys for communicating direction information and command selections to processor 410 and for controlling cursor movement on display device 430.

A communication device 450 may also be coupled to the bus 405. Depending upon the particular implementation, the communication device 450 may include a transceiver, a wireless modem, a network interface card, or other interface device. The computer 400 may be linked to a network or to other devices using the communication device 450, which may include links to the Internet, a local area network, or another environment. Under an embodiment of the invention, the computer 400 may be linked to a server, including a PXE server, via the communication device 450.

Figure 5:
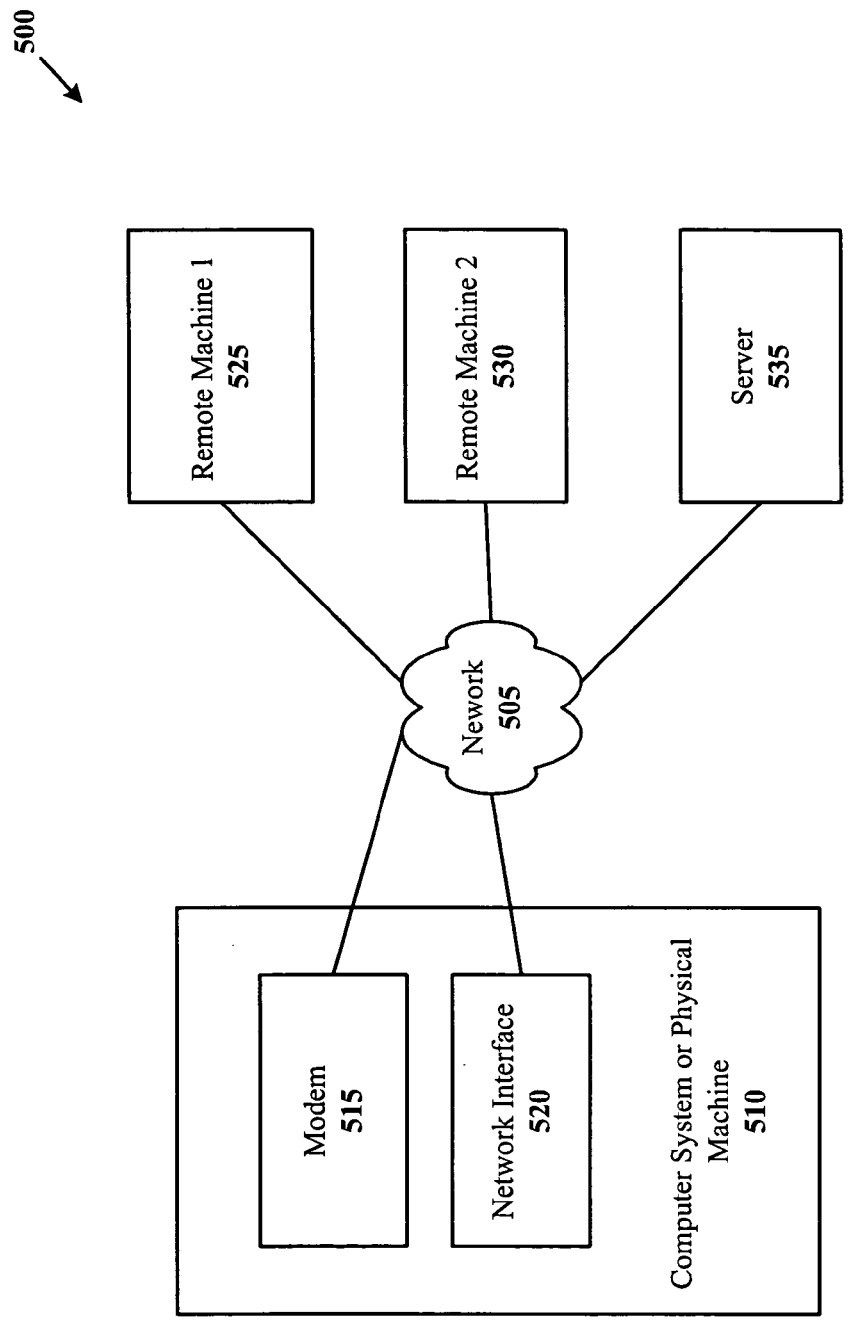
FIG. 5 illustrates an embodiment of a computer network.

FIG. 5 illustrates an embodiment of a computer network environment 500. According to one embodiment, a network 505 is present. The network 505 may include a physical network, a logical network, a wide area network (WAN), a local area network (LAN), the Internet, an intranet, or any other computer network or computer communication environment. A computer system or physical machine 510 (machine) may include a single machine, or multiple machines coupled with each other directly, or via a network or device, or via other physical and/or logical links. The machine 510 may include a PXE client.

According to one embodiment, the machine 510 may include a modem 515, a network interface 520, and any other type of connection that allows communication with the network 505. A communication via the network 505 may include the use of any of wired or wireless carrier and protocols, including radio frequency (RF), satellite, microwave, Bluetooth, optical, infrared, cable, laser, or other process. The machine 510 may communicate with various remote machines via the network 505. The remote machines are shown as, for example, remote machine 1 525 and remote machine 530. The possible remote machines may include a server 535. The server 535 may include a PXE server. Under an embodiment of the invention, the machine 510 may boot an operating system remotely in conjunction with server 535.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs (read-only memory), RAMs (random access memory), EPROMs (erasable programmable read-only memory), EEPROMs (electrically-erasable programmable read-only memory, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   requesting a memory address region and network boot load data from a server;
   receiving the network boot load data and a designated memory region from the server;
   loading the network boot load data into the designated memory region;
   running the network boot load data;
   jumping to a designated memory region for an operating system; and
   initializing the operating system.

2. The method of claim 1, wherein initializing the operating system comprises initializing using the network boot load data without use of a network bootstrap program.

3. The method of claim 1, further comprising discovering a network protocol identifier.

4. The method of claim 1, further comprising operating utilizing PXE (preboot execution environment), and wherein PXE is used to directly load network data into system memory.

5. The method of claim 4, wherein network data is directly loaded into system memory though use of a UNDI (Universal Network Device Interface) network interface.

6. The method of claim 1, wherein the network boot load data comprises a bootloading API (application program interface).

7. A method comprising:
   receiving a packet comprising a network protocol identifier from a client;
   transferring an offer packet to the client;
   receiving a request for a boot memory region from the client;
   designating a boot memory region; and
   transferring network boot load data and the designation of the boot memory region to the client;
   wherein the client initializes an operating system utilizing the boot load data.

8. The method of claim 7, further comprising operating utilizing PXE (preboot execution environment).

9. The method of claim 7, wherein a network bootstrap program is not transferred to the client.

10. A client system comprising:
    a memory; and
    a bootloader, the bootloader to:
    request a memory address region for the memory and network boot load data from a server;
    receive the network boot load data and a designated memory region from the server; and
    load the network boot load data into the designated memory region;
    wherein the bootloader is to jump to the designated memory region and start an operating system using the network boot load data.

11. The client system of claim 10, wherein the bootloader is to discover a network protocol identifier.

12. The client system of claim 10, wherein the bootloader utilizes PXE (preboot execution environment).

13. The client system of claim 10, wherein network boot load data is directly loaded into the memory though use of a UNDI (Universal Network Device Interface) network interface.

14. The client system of claim 10, wherein the network boot load data comprises a bootloading API (application program interface).

15. The client system of claim 10, wherein the bootloader starts an operating system without use of a network bootstrap program.

16. A machine-readable medium having stored thereon data representing sequences of instructions that, when executed by a processor, cause the processor to perform operations comprising:
- requesting a memory address region and network boot load data from a server;
- receiving the network boot load data and a designated memory region from the server;
- storing the network boot load data at the designated memory region;
- running the network boot load data;
- jumping to a designated memory region for an operating system; and
- initializing the operating system.

17. The medium of claim 16, wherein initializing the operating system comprises initializing using the network boot load data without use of a network bootstrap program.

18. The medium of claim 16, further comprising instructions that, when executed by the processor, cause the processor to perform operations comprising discovering a network protocol identifier.

19. The medium of claim 16, further comprising instructions that, when executed by the processor, cause the processor to perform operations comprising operating utilizing PXE (preboot execution environment), and
- wherein PXE is used to directly load network data into system memory.

20. The medium of claim 19, wherein network data is directly loaded into system memory though use of a UNDI (Universal Network Device Interface) network interface.

21. The medium of claim 16, wherein the network boot load data comprises a bootloading API (application program interface).

22. The medium of claim 16, further comprising instructions that, when executed by the processor, cause the processor to perform operations comprising initializing an operating system without use of a network bootstrap program.

23. A machine-readable medium having stored thereon data representing sequences of instructions that, when executed by a processor, cause the processor to perform operations comprising:
- receiving a packet comprising a network protocol identifier from a client;
- transferring an offer packet to the client;
- receiving a request for a boot memory region from the client;
- designating a boot memory region; and
- transferring network boot load data and the designation of the boot memory region to the client;
- wherein the client initializes an operating system utilizing the boot load data.

24. The medium of claim 23, further comprising instructions that, when executed by the processor, cause the processor to perform operations comprising operating utilizing PXL (preboot execution environment).

25. The medium of claim 23, wherein a network bootstrap program is not transferred to the client.

* * * * *

UNITED STATES PATENT AND TRADEMARK OFFICE
CERTIFICATE OF CORRECTION

PATENT NO.         : 7,243,224 B2                                        Page 1 of 1
APPLICATION NO.    : 10/749999
DATED              : July 10, 2007
INVENTOR(S)        : Nair et al.

It is certified that error appears in the above-identified patent and that said Letters Patent is hereby corrected as shown below:

In column 8, at line 29, delete "PXL" and insert --PXE--.

Signed and Sealed this

Twenty Second Day of April, 2008

JON W. DUDAS
*Director of the United States Patent and Trademark Office*